United States Patent
Lambert

(10) Patent No.: US 8,666,062 B2
(45) Date of Patent: *Mar. 4, 2014

(54) METHOD AND APPARATUS FOR PERFORMING FINITE FIELD CALCULATIONS

(75) Inventor: Robert J. Lambert, Cambridge (CA)

(73) Assignee: Certicom Corp., Mississauga (CA)

( * ) Notice: Subject to any disclaimer, the term of this patent is extended or adjusted under 35 U.S.C. 154(b) by 1354 days.

This patent is subject to a terminal disclaimer.

(21) Appl. No.: 12/101,590

(22) Filed: Apr. 11, 2008

(65) Prior Publication Data

US 2009/0077144 A1 Mar. 19, 2009

Related U.S. Application Data

(63) Continuation of application No. 10/058,212, filed on Jan. 29, 2002, now Pat. No. 7,372,960.

(60) Provisional application No. 60/343,226, filed on Dec. 31, 2001, provisional application No. 60/343,227, filed on Dec. 31, 2001, provisional application No. 60/343,220, filed on Dec. 31, 2001, provisional application No. 60/334,223, filed on Dec. 31, 2001.

(51) Int. Cl.
*H04L 9/00* (2006.01)

(52) U.S. Cl.
USPC ............... 380/28; 380/44; 713/169; 713/171

(58) Field of Classification Search
None
See application file for complete search history.

(56) References Cited

U.S. PATENT DOCUMENTS

| | | | |
|---|---|---|---|
| 5,982,895 A | 11/1999 | Dworkin et al. | |
| 6,049,815 A | 4/2000 | Lambert et al. | |
| 6,199,086 B1 | 3/2001 | Dworkin et al. | |
| 6,230,179 B1 * | 5/2001 | Dworkin et al. | 708/492 |
| 6,263,081 B1 | 7/2001 | Mijaji et al. | |
| 6,430,588 B1 | 8/2002 | Kobayashi et al. | |
| 6,466,668 B1 | 10/2002 | Miyazaki et al. | |
| 6,480,606 B1 | 11/2002 | Kurumatani | |
| 6,618,483 B1 | 9/2003 | Vanstone et al. | |
| 6,714,648 B2 | 3/2004 | Miyazaki et al. | |
| 7,111,166 B2 * | 9/2006 | Dror et al. | 713/174 |
| 7,286,666 B1 | 10/2007 | Coron | |
| 2002/0136402 A1 * | 9/2002 | Vanstone | 380/30 |
| 2003/0021410 A1 | 1/2003 | Miyazaki et al. | |

* cited by examiner

*Primary Examiner* — Kaveh Abrishamkar
(74) *Attorney, Agent, or Firm* — Brett J Slaney; John R. S. Orange; Blake, Cassels & Graydon LLP

(57) ABSTRACT

In general terms, the invention provides a finite field engine and methods for operating on elements in a finite field. The finite field engine provides finite field sub-engines suitable for any finite field size requiring a fixed number of machine words. The engine reuses these engines, along with some general purpose component or specific component providing modular reduction associated with the exact reduction (polynomial or prime) of a specific finite field. The engine has wordsized suitable code capable of adding, subtracting, multiplying, squaring, or inverting finite field elements, as long as the elements are representable in no more than the given number of words. The wordsized code produces unreduced values. Specific reduction is then applied to the unreduced value, as is suitable for the specific finite field. In this way, fast engines can be produced for many specific finite fields, without duplicating the bulk of the engine instructions (program).

21 Claims, 15 Drawing Sheets

METHOD AND APPARATUS FOR PERFORMING FINITE FIELD CALCULATIONS

CROSS REFERENCE TO RELATED APPLICATION

The present application is a continuation of U.S. patent application Ser. No. 10/058,212 filed on Jan. 29, 2002 now U.S. Pat. No. 7,372,960 which claims priority from U.S. Provisional Patent Application Nos. 60/343,226, 60/343,227, 60/343,220, 60/334,223, all filed on Dec. 31, 7001, the contents of each of which are incorporated herein by reference.

FIELD OF THE INVENTION

The invention relates to finite fields, and more particularly to a finite field engine for use with cryptographic systems.

BACKGROUND OF THE INVENTION

Cryptography is commonly used to provide data security, integrity, and authentication over unsecured communication channels. For example, a connection between two correspondents over the Internet or a wireless network could easily be monitored by an eavesdropper. To protect their confidentiality, the correspondents could encrypt their transmissions with a secret key. They could also use various cryptographic protocols to provide authentication of the other party. Traditional protocols using symmetric-key cryptography require that the correspondents share a secret key before initiating secure communications. This key must be shared through some secure channel, which may be difficult and expensive to obtain. However, the correspondents can avoid having to share a secret key ahead of time by using public-key cryptography.

Correspondents using public key cryptography each have a private key and a corresponding public key. The derivation of the public key is such that it is computationally infeasible to compute the private key given only the public key. However, the mathematical relationship between the keys allows them to be used to provide security, integrity, or authentication in various protocols where the public keys are shared and the private keys are kept secret.

Elliptic curve cryptography (ECC) is a particularly efficient form of public key cryptography that is especially useful in constrained environments such as personal digital assistants, pagers, cellular phones, and smart cards. To specify an elliptic curve, a finite field and an equation over that finite field are needed. The points on the elliptic curve are the pairs of finite field elements satisfying the equation of the curve, as well as a special point at infinity. To carry out calculations involving points on the elliptic curve, calculations are done in the underlying finite field, according to well-known formulas that use parameters of the curve. These formulas define an addition operation on a pair of elliptic curve points. A scalar multiplication operation is defined by repeated additions, analogously to regular integer multiplication. An integer n, called the order of the curve, is the order of the elliptic curve group.

An elliptic curve cryptosystem may have certain parameters common to all users of the system. These could include the finite field, the elliptic curve, and a generator point on the curve. These system parameters are often common to a group of users who each generate a key pair comprising a private key and a public key. A correspondent's private key is an integer less than the order of the elliptic curve, preferably generated at random. The correspondent's public key is the elliptic curve point obtained by scalar multiplication of the private key with a generator point.

The security level of a cryptographic system mainly depends on the key size that is used. Larger key sizes give a higher security level than do smaller key sizes, since the time required for an attack on the system depends on the total number of possible keys, however, different key sizes require defining different elliptic curves over different finite fields. Generally, the greater the desired cryptographic strength of the ECC, the larger will be the size of the finite field.

Thus an implementation of elliptic curve cryptography may need to support several different finite fields for use in particular applications. Implementing an elliptic curve cryptosystem therefore requires either the implementation of specific methods for each finite field or a generic method usable in any finite field. Each approach offers different advantages.

The use of specific methods for each finite field leads to more efficient code since it may be optimized to take advantage of the specific finite field. However, supporting several finite fields in this way will increase the code size dramatically.

The use of a generic method prevents the use of optimization techniques, since the code cannot take advantage of any particular properties of the finite field. This makes the code less efficient but has the advantage of much smaller code size.

Many implementations of elliptic curve cryptosystems employ binary finite fields, that is fields of characteristic 2. In these fields, elements may be represented as polynomials with binary coefficients, which may be represented as bits in hardware or software. These bits must then be represented in the memory storage of the computer system. Other implementations use fields of prime characteristic p greater than 2. In these fields, elements are usually represented as integers less than p.

Software implementation of finite fields raises the question of how to arrange the storage of the bits corresponding to the finite field elements.

When using a general purpose computational engine (for example a typical CPU), finite field elements are often too long to be represented in a single machine word of the engine (engine word lengths are typically 16, 32 or 64 bit). Since the finite field used in ECC operations are typically 160 bits or more, these elements must be represented in several machine words.

Engine routines (programs) that provide finite field calculations must therefore deal with multiple machine words to complete their calculations. If the finite field irreducible, or prime is known in advance, then the number of words that must be dealt with is also known in advance, and more efficient code can be written that expressly deals with exactly the right number of components.

If the finite field irreducible (F2m), or prime (ep) is not known in advance, typically general purpose code is built that can handle any number of word components in the finite fields, but this code is typically much slower because of the overhead of dealing with the unspecified number of components. The advantage of this general purpose, wordsize non-specific code is that the engine description (program size) is small when compared against specific engines each tailored to a specific finite field.

With either type of codes, it is necessary to provide finite field operations including multiplication, addition, inversion, squaring and modular reduction.

Generally, multiplication of two bit strings representing elements in $F_2^m$ is performed in a similar manner as integer multiplication between a multiplicand and a multiplier and uses bit shifting and zero placement. Beginning with the right most bit ($0^{th}$ position) of the multiplier, the multiplicand is multiplied by the selected bit. The resulting intermediate value is then stored in an accumulator. The multiplicand is then multiplied by a second bit of the multiplier located in the $1^{st}$ position, adjacent to the bit in the $0^{th}$ position. The resulting intermediate value is then stored in a predetermined intermediate value register and shifted to represent a zero placeholder, similar to the tens placeholder in base 10 multiplication. The exclusive or (XOR) of these two intermediate values, stored in the accumulator and the predetermined intermediate value resister is computed and the result stored in the accumulator. The multiplicand is then multiplied by the bit in the $2^{nd}$ position of the multiplier and the intermediate value stored in the predetermined intermediate value register. The intermediate value is then shifted by two places to represent the zero placeholders and the XOR of the intermediate value and the accumulator is computed. The accumulator is then updated with the new result. These steps are repeated until the multiplicand has been multiplied with each of the bits of the multiplier ending with the left most bit of the multiplier. It will be understood that the bit shifting of the intermediate values corresponds to the placement of the bit with respect to the number of zero placeholders that are required. The final value stored in the accumulator is then retrieved and is the product of the multiplicand and the multiplier.

As will be understood, by separately multiplying the multiplicand and each bit of the multiplier, many bit shifts are required. In particular, it is necessary to perform bit shifts for each bit of the multiplier. This results in longer processing time and also extra processor operation.

Inversion

Inversion in a finite field is usually performed using the Extended Euclidean Algorithm. In a field with prime characteristic p or irreducible f an element x may be inverted by using the EEA to find a solution to the equation:

$$ax+bp=1 \text{ (or } ax+bf=1).$$

Then $ax \equiv 1 \bmod p$ and $a \equiv x^{-1} \bmod p$
(or $ax \equiv 1 \bmod f$ and $a \equiv x^{-1} \bmod f$)
A common technique is to use two starting equations:

$$0x+1p=p$$

$$1x+1p=x<p$$

A multiple of the second equation is then subtracted from the first equation:

$$-qx+1p=p-qx$$

The process continues until a 1 is obtained on the right hand side (RHS).

This process is often shown using a table as in the following example of computing $113^{-1} \bmod 239$.

| a | b | a · 113 + b · 239 |
|---|---|---|
| 0 | 1 | 239 |
| 1 | 0 | 113 |
| -2 | 1 | 13 |
| 17 | -8 | 9 |
| -19 | 9 | 4 |
| 55 | -25 | 1 |

Thus $55 \cdot 113 - 25 \cdot 239 = 1$ and $55 \equiv 113^{-1} \bmod 239$.

It will be recognized that it is not necessary to keep track of the "b" values.

There are several variants on the Extended Euclidean Algorithm that perform similar computations, such as almost inverses.

Accordingly, there is a need for a method of performing calculations in a binary finite field which obviates or mitigates some of the above disadvantages.

SUMMARY OF THE INVENTION

In general terms, the invention provides a finite field engine and methods for operating on elements in a finite field. The finite field engine provides finite field sub-engines suitable for any finite field size requiring a fixed number of machine words. The engine reuses these engines, along with some general purpose component or specific component providing modular reduction associated with the exact reduction polynomial or prime) of a specific finite field. The engine has wordsized suitable code capable of adding, subtracting, multiplying, squaring, or inverting finite field elements, as long as the elements are representable in no more than the given number of words. The wordsized code produces unreduced values. Specific reduction is then applied to the unreduced value, as is suitable for the specific finite field. In this way, fast engines can be produced for many specific finite fields, without duplicating the bulk of the engine instructions (program).

In accordance with one aspect of the present invention, there is provided a method of adding elements of a finite field $F_{2^m}$, where m is less than a predetermined number n is provided, the method comprising the steps of:
  a) storing a first and a second element in a pair of registers, each of the pair of registers comprising the predetermined number of machine words;
  b) establishing an accumulator having the predetermined number of machine words;
  c) computing for each of the machine words in the accumulator the exclusive-or of the corresponding machine words representing each of the first and second elements.

In accordance with a further aspect of the present invention, there is provided a device for adding a pair of elements of a finite field $F_{2^m}$ where m is less than a predetermined number n, comprising: a pair of registers for storing said pair of elements, each of the registers consisting of n machine words; an accumulator consisting of n machine words; an output resister consisting of n machine words; an XOR gate connected to a respective machine word in each of the pair of registers and providing an output to a respective one of the machine words.

In accordance with another aspect of the invention, there is provided a finite field multiplier operable to multiply two elements of one of a plurality of finite fields, said finite fields being partitioned into subsets, said multiplier comprising:
  a) a plurality of wordsized finite field multipliers, each suitable for multiplying elements of each finite field in a respective subset of said plurality of finite fields;
  b) a finite field reducer configured to perform reduction in said one finite field;
  c) a processor configured to
    i) operate the wordsized finite field multiplier suitable for use with said one finite field to obtain an intermediate product; and
    ii) operate said finite field reducer on said intermediate product to obtain the product of the two elements.

In accordance with yet another aspect of the present invention, there is provided a method of performing a finite field operation on two elements r, s of a finite field, comprising the steps of:

a) performing a wordsized operation of r and s, said wordsized operation corresponding to said finite field operation;

b) performing a modular reduction of the result of step a);

In accordance with still another aspect of the present invention, there is provided a finite field engine for performing a finite field operation on at least one element of a finite field chosen from a set of finite fields, said set of finite fields being divided into subsets according to their word size, comprising:

a) a finite field operator for each of said subsets;

b) a finite field reducer for each of said finite fields;

c) a processor configured to choose the finite field operator corresponding to the subset containing said chosen finite field and the finite field reducer for said chosen finite field and apply the chosen finite field operator to said element to produce an intermediate result and apply the chosen finite field reducer to said intermediate result to obtain the result of said finite field operation.

In accordance with a still further aspect of the invention, there is provided a cryptographic system comprising:

a) a plurality of elliptic curves, each specifying elliptic curve parameters and a respective finite field;

b) a plurality of finite field settings corresponding to each finite field;

c) a plurality of wordsized finite fields, each having routines, each finite field being assigned to one of said wordsized finite fields;

d) a reduction routine for each finite field;

e) a computational apparatus configured to perform a cryptographic operation by the steps of:
  i) selecting one of said elliptic curves;
  ii) performing a cryptographic function using the routines from the wordsized finite field to which the respective finite field corresponding to said selected elliptic curve is assigned.

BRIEF DESCRIPTION OF THE DRAWINGS

These and other features of the preferred embodiments of the invention will become more apparent in the following detailed description in which reference is made by way of example only to the appended drawings wherein.

DESCRIPTION OF THE PREFERRED EMBODIMENTS

Figure 1:
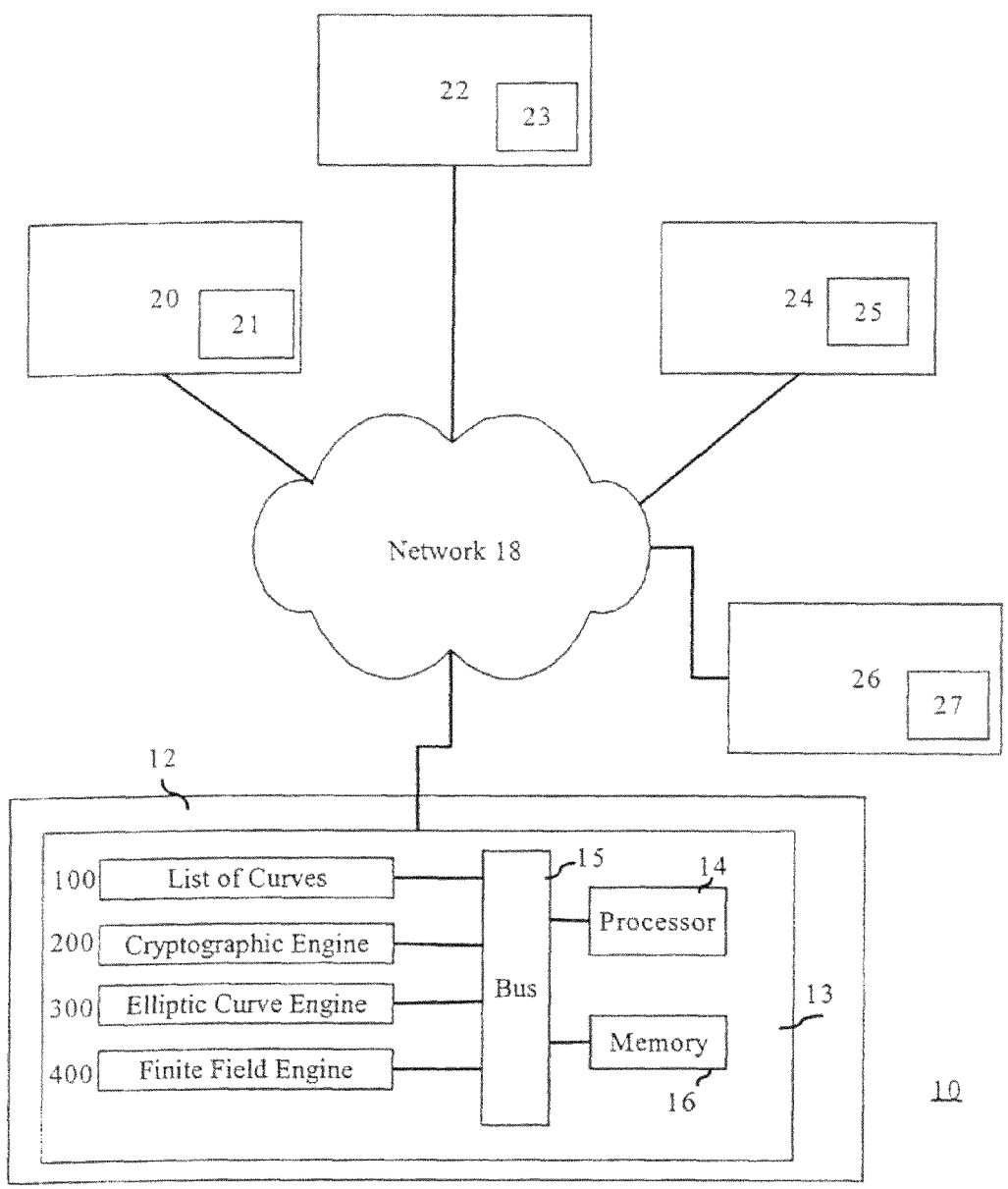
FIG. 1 is a schematic representation of a data communication system.

Referring to FIG. 1, a communication system having at least two correspondents is shown generally by numeral 10. A correspondent 12 is connected through a network 18 to a plurality of correspondents, shown in the example of FIG. 1 as 20, 22, 24, and 26. The correspondent 12 has a cryptographic unit 13 including a processor 14, a bus 15, a memory 16, a set of elliptic curves 100 with corresponding parameters, a cryptographic engine 200, an elliptic curve engine 300, and a finite field engine 400. Each of the correspondents 20, 22, 24, 26 has a cryptographic unit providing at least one elliptic curve shown as 21, 23, 25, and 27, respectively. The correspondent 12 can communicate using public key cryptography with any correspondent which has at least one elliptic curve in common with it. In operation, data is stored in the memory 16 and communicated over the bus 15. The processor 14 operates to execute an appropriate engine 200, 300, 400 on the data. The engines may be software instructions executed by the processor, or they may have dedicated coprocessors.

Figure 2:
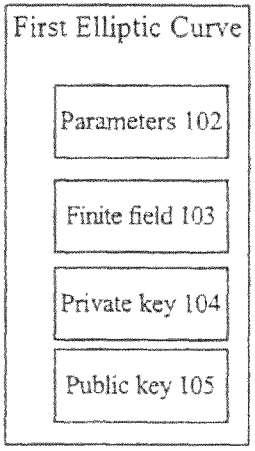
FIG. 2 is a detailed view of the list of parameters 100 shown in FIG. 1.
Figure 2:
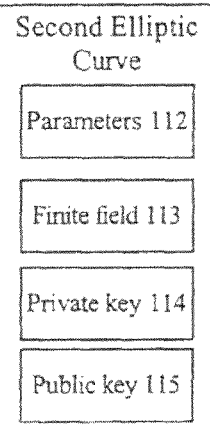

Referring to FIG. 2, the set of elliptic curves 100 contains a plurality of elliptic curves exemplified as a first elliptic curve 101, and a second elliptic curve 111. Each curve 101, 111 has associated parameters 102, 112 for indicating its elliptic curve equation. Each curve 101, 111 also has an associated finite field 103, 113. A private key 104, 114 is provided for use with each curve, and a corresponding public key 105, 115 derived from a seed point P and the private key 104.

Figure 3:
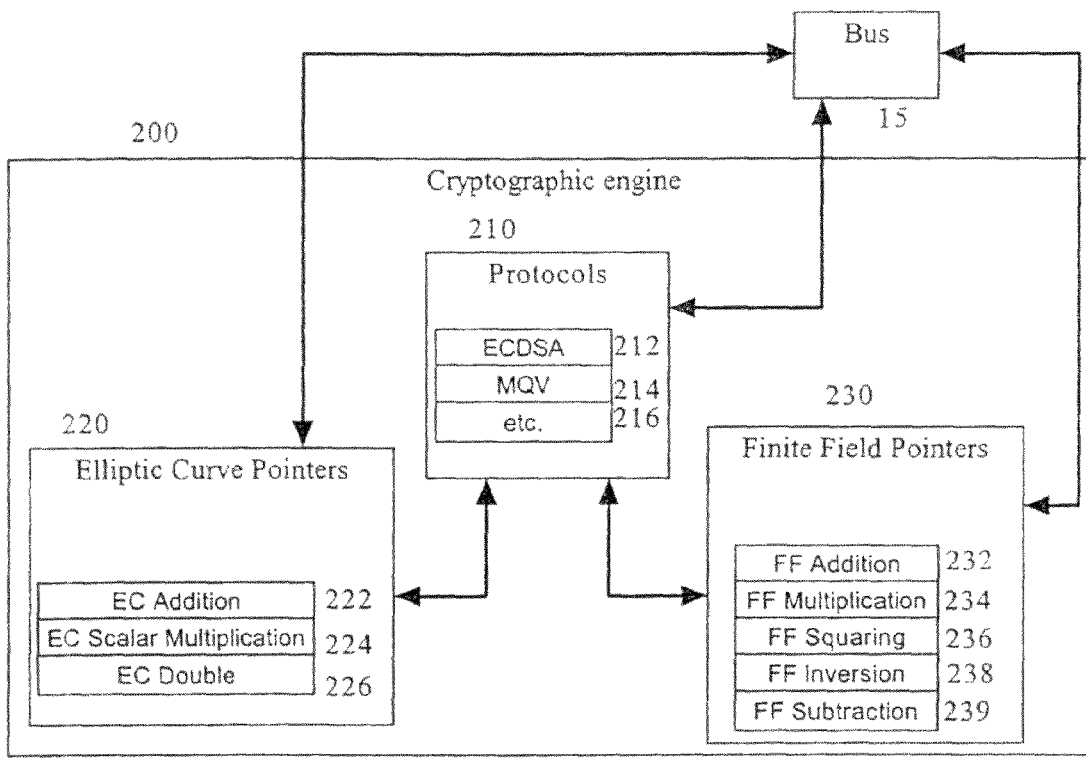
FIG. 3 is a detailed view of the cryptographic engine 200 shown in FIG. 1.

Referring to FIG. 3, the cryptographic engine 200 comprises instruction sets to implement selectively a plurality of protocols 210, exemplified by the ECDSA protocol 212, the MQV protocol 214, and others 216. The implementation of the protocols 210 requires the use of both elliptic curve operations and finite field operations. The protocols 210 are configured to treat the elliptic curve operations and finite field operations abstractly. Accordingly, the cryptographic engine provides pointers 220 to elliptic curve operations and pointers 230 to finite field operations. The protocols 210 use the pointers 220 and 230 to perform selectively the elliptic curve and finite field operations.

In use, the processor 14 executes the cryptographic engine 200 to set the pointers 220 and 230 to use the appropriate operations in the elliptic curve engine 300 and the finite field engine 400. More specifically, pointer 222 references an elliptic curve addition operation, pointer 224 references an elliptic curve scalar multiplication operation, and pointer 226 references an elliptic curve double operation. Further, pointer 232 references a finite field (FF) addition operation, pointer 234 references a finite field multiplication operation, pointer 236 references a finite field squaring operation, and pointer 238 references a finite field inversion operation. A pointer 239 references a finite field subtraction operation for use in finite field $F_p$ of prime characteristic. (A separate subtraction operation is not necessary in $F_{2^m}$ because subtraction is the same as addition since the field of characteristic 2).

Figure 4:
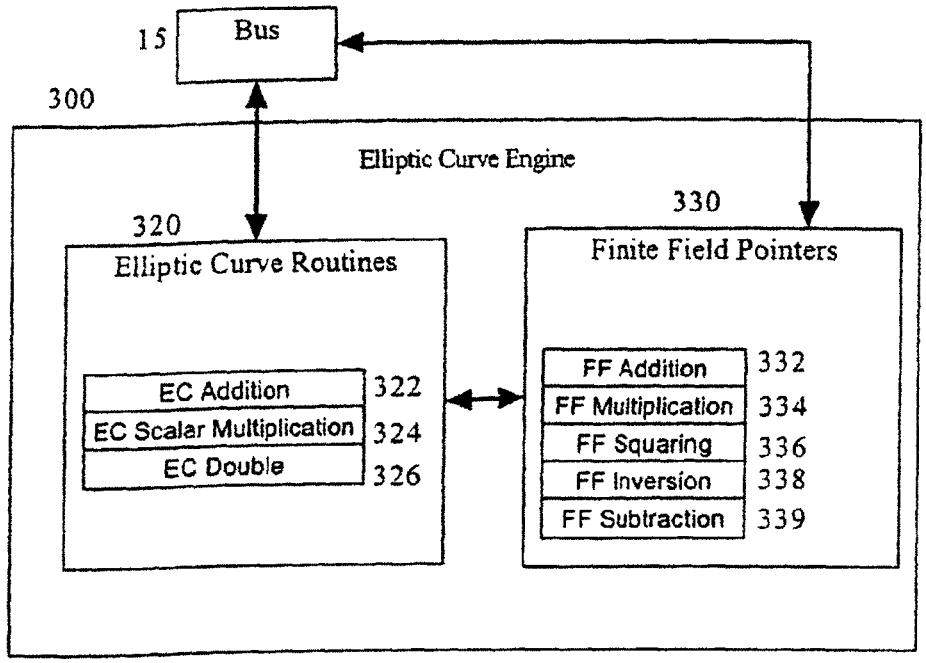
FIG. 4 is a detailed view of the elliptic curve engine 300 shown in FIG. 1.

As can be seen from FIG. 4, the elliptic curve engine 300 comprises a plurality of elliptic curve routines 320 corresponding to the pointers 220 in the cryptographic engine 200. There is a corresponding operation for each pointer 222, 224, 226 namely an elliptic curve addition operation 322, an elliptic curve scalar multiplication operation 324 and an elliptic curve double operation 326. Each elliptic curve operation 320 requires certain finite field operations, and so accordingly pointers 330 are provided to operations in the finite field engine 400, corresponding to the pointers 230 in the cryptographic engine 200.

Figure 5:
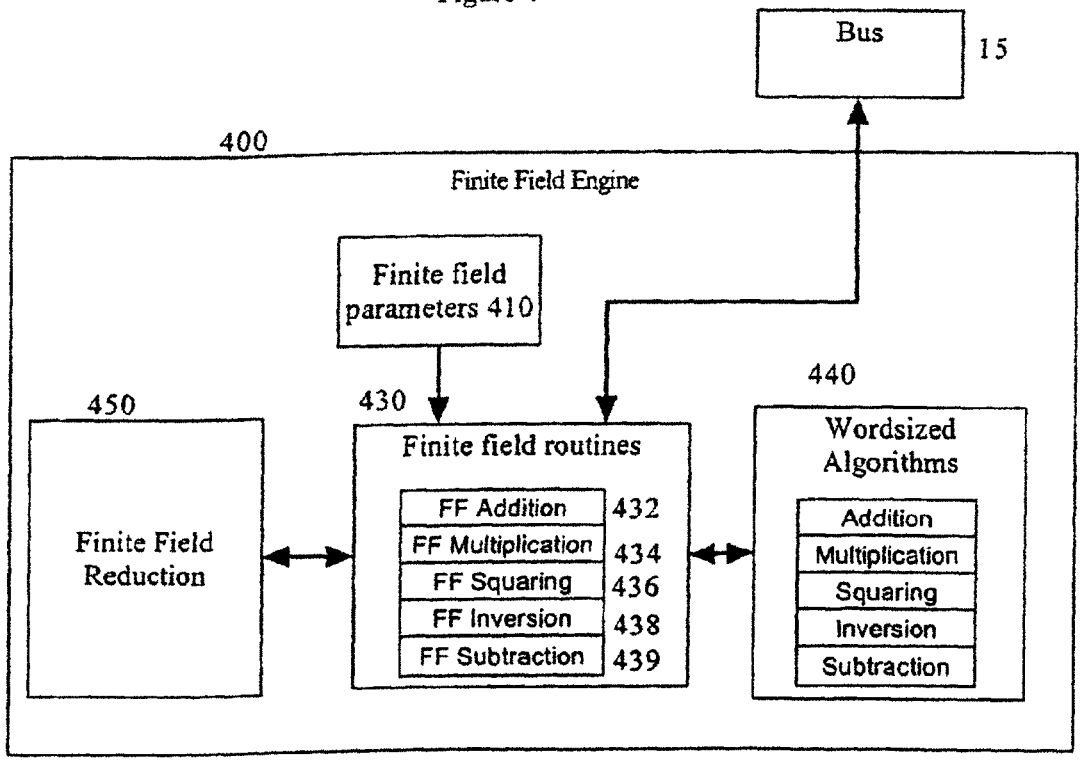
FIG. 5 is a detailed view of the finite field engine 400 shown in FIG. 1.

Referring to FIG. 5, the finite field engine 400 is shown in more detail. Each finite field has associated parameters 410, which detail the characteristic of that finite field and its word size. A plurality of finite field operations shown generally at numeral 430 are provided, corresponding to the set of pointers 230 and 330 in the cryptographic engine and the elliptic curve engine, respectively. Accordingly, a finite field addition operation 432, a finite field multiplication operation 434, a finite field squaring operation 436, and a finite field inversion operation 438 is provided. A finite field subtraction operation 439 is provided for use in finite fields $F_p$. Each finite field operation 430 makes use of wordsized algorithms 440, which are provided for each word size and described below. A plurality of specialized reduction algorithms 450 is provided, there being one reduction algorithm for each field in the list 410.

The data passed between the engines 200, 300, 400 comprises finite field elements, since arm elliptic curve point consists of two finite field elements. The finite field elements are only operated on directly by the finite field engine 400, and are stored as a set of words in the format shown below in FIG. 10.

Referring to FIGS. 6 through 9, one of the protocols 210 requires steps 610 which call operations from the elliptic curve engine 300 and the finite field engine 400. Typically, a protocol 210 may call elliptic curve scalar multiplication 622, elliptic curve addition 624, elliptic curve double 626 and may call finite field operations directly such as addition 632, multiplication 634, and inversion 636. The order of the calls and the data passed to them is determined by the specific one of the protocols 210.

In one exemplary protocol, the ECDSA protocol 212 requires the computation of two signature components r and s, which are given by the formulas:

$$r=kP$$

$$s=k^{-1}(e+dr)$$

Figure 7:
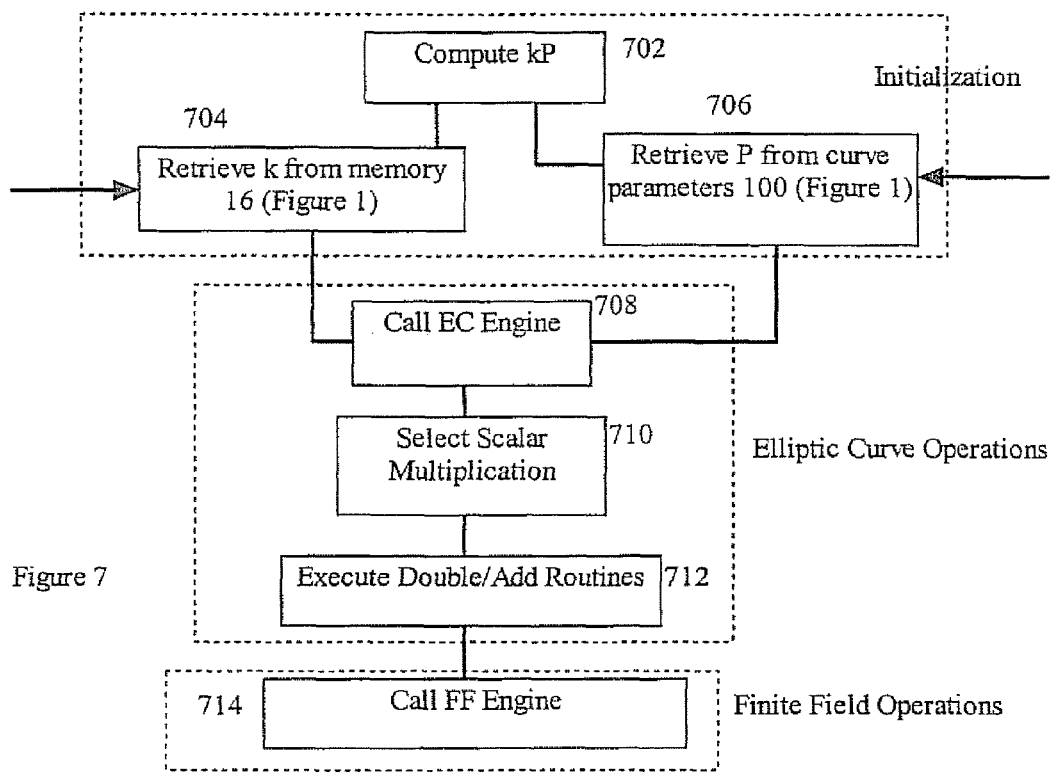
FIG. 7 is a schematic representation of an elliptic curve scalar multiplication operation provided by the elliptic curve engine 300 of FIG. 4 and used by the protocol shown in FIG. 7.

To compute r, the ECDSA protocol 212 operates as shown in FIG. 7. In the initialization phase, the protocol begins the computation of kP (702). In this first retrieve k from memory 16 of FIG. 1 (704). It must also retrieve P from curve parameters 100 in FIG. 1 (706). The protocol then proceeds to the elliptic curve operations, by calling the elliptic curve engine (708). It selects scalar multiplication (710) with the input being kP. The scalar multiplication executes double and add routines (712). These routines in turn direct finite field operations by calling the finite field engine (714).

Figure 8:
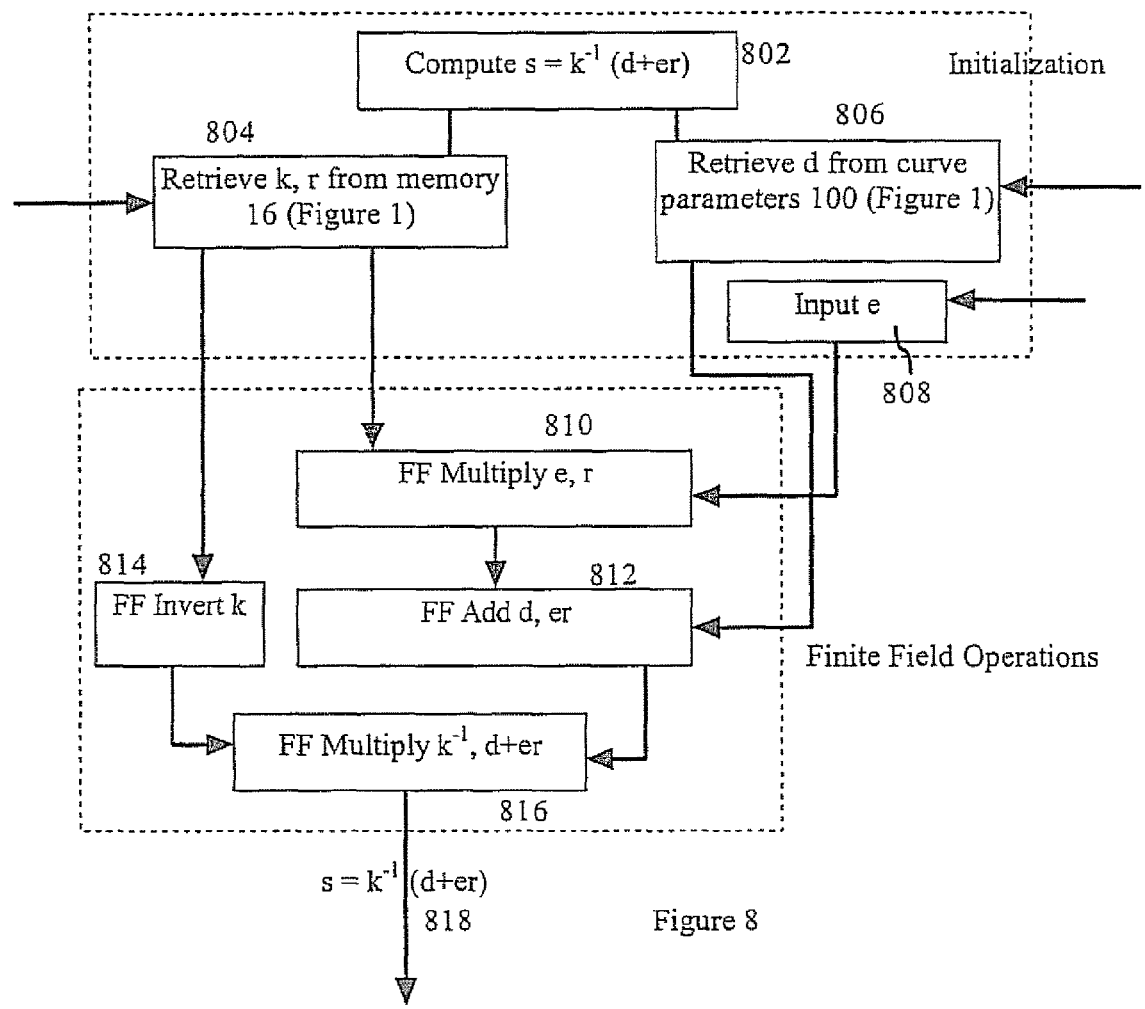
FIG. 8 is a schematic representation of a signature component provided by the protocol 210 of FIG. 8.

To compute the signature component s, the ECDSA protocol 212 operates as shown in FIG. 8. In the initialization phase, it is desired to compute s (802). The protocol must first retrieve k and r from the memory 16 of FIG. 1 (804). It must also retrieve d, the long-term private key, from the curve parameters 100 of FIG. 1 (806). It then inputs the hash of a message e (808). The protocol proceeds with finite field operations by calling a finite field multiplication (810) of e and r to obtain er. The protocol then executes a finite field addition of d and er (812) to obtain d+er. The protocol executes a finite field inversion of k (814) to obtain $k^{-1}$. The protocol then executes a finite field multiplication of $k^{-1}$ and d+er (816). The result of this multiplication is a signature component s (818). The signature component s is then provided to the remainder of the protocol.

Figure 9:
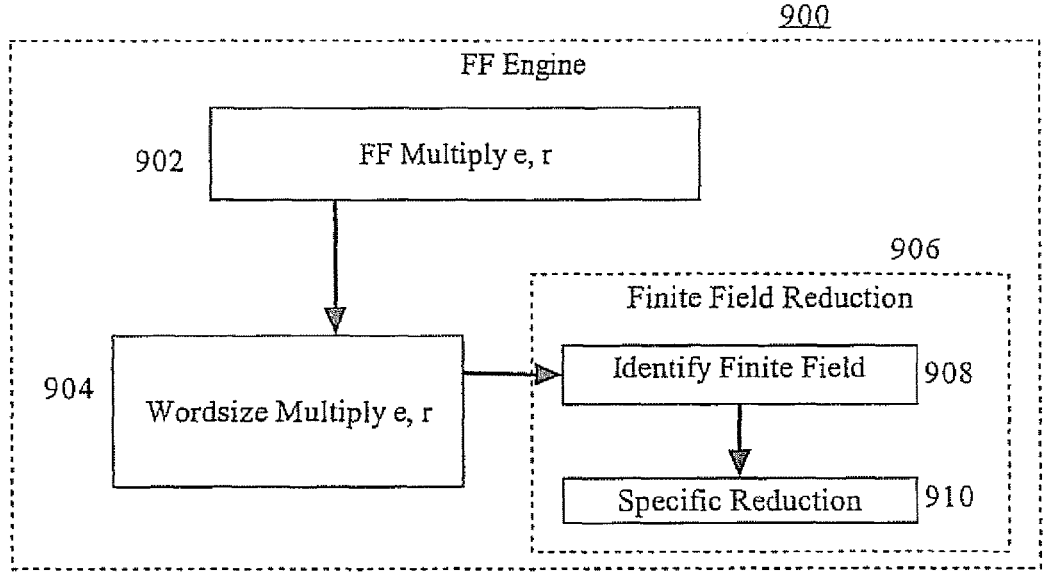
FIG. 9 is a schematic representation of a finite field multiplication in the method of FIG. 8.

Referring particularly to FIG. 9, the finite field multiplication 810 within the finite field engine 400 is shown generally by the numeral 900. To perform finite field multiplication 902 of e and r, the finite field engine executes 904 a wordsized multiplication of e and r. The result of the wordsized multiplication is passed 906 to the finite field reduction 450. The finite field is first identified 908, and then a specific reduction 910 is executed. The specific reduction corresponds to the particular finite field identified.

It may be seen that computations on finite field elements are performed by the finite field engine 400. Accordingly, the data storage in the finite field engine 400 determines the nature of the data that is passed between the various engines and computed by them.

Finite field elements are stored by the finite field engine 400 in memory segments larger than are actually required. The most significant bits are set to 0. Operations can be performed on these elements by acting on the memory segment as a whole, while ignoring the extra bits. This representation is referred to as a "wordsized" representation.

The finite field engine 400 provides finite field routines 430 for use by the cryptographic engine 200 and the elliptic curve engine 300. When these finite field routines 430 are called, the finite field engine 400 uses the parameters of the finite field 410 to choose the appropriate wordsized algorithm 440. After applying the wordsized algorithm 440, the finite field engine reduces the result using a finite field reduction 450. The finite field reduction may be specific to a certain finite field, or a wordsize reduction. The reduction should lower the length of the result to the appropriate word length of the underlying field. This way, finite field elements may be consistently stored in registers of the same word length. The reduction need not to be the minimal reduction but need only be enough to ensure that the result fits into the given number of words.

Figure 10:
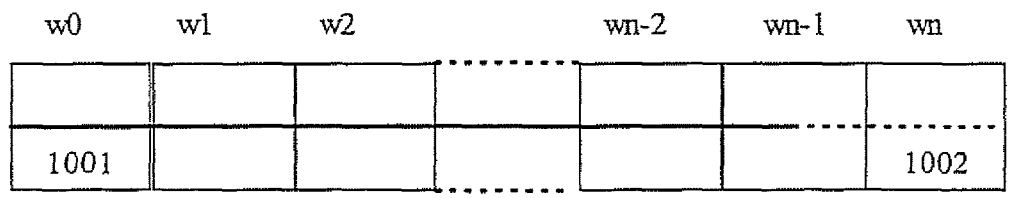
FIG. 10 is a schematic representation of a memory segment used by the finite field engine 400 of FIG. 5.

Referring therefore to FIG. 10, an exemplary memory segment 1000 provides a fixed number of machine words w0, w1, ..., w5. The use of 6 words is by way of example only and to provide for clearer presentation. An element is stored with the least bit on the least bit of w0 and ending before the most significant bit of w5, as shown generally by numeral 1001. Certain bits 1002 are unused in this representation. Alternative representations and orderings of the bits are possible. In order to perform the operations taking advantage of the data structure of the memory segment 1000, the finite field engine 400 has to implement fundamental finite field operations of addition, multiplication, inversion, and modular reduction. Particular implementations of these operations are described below.

Wordsized Addition

Figure 11:
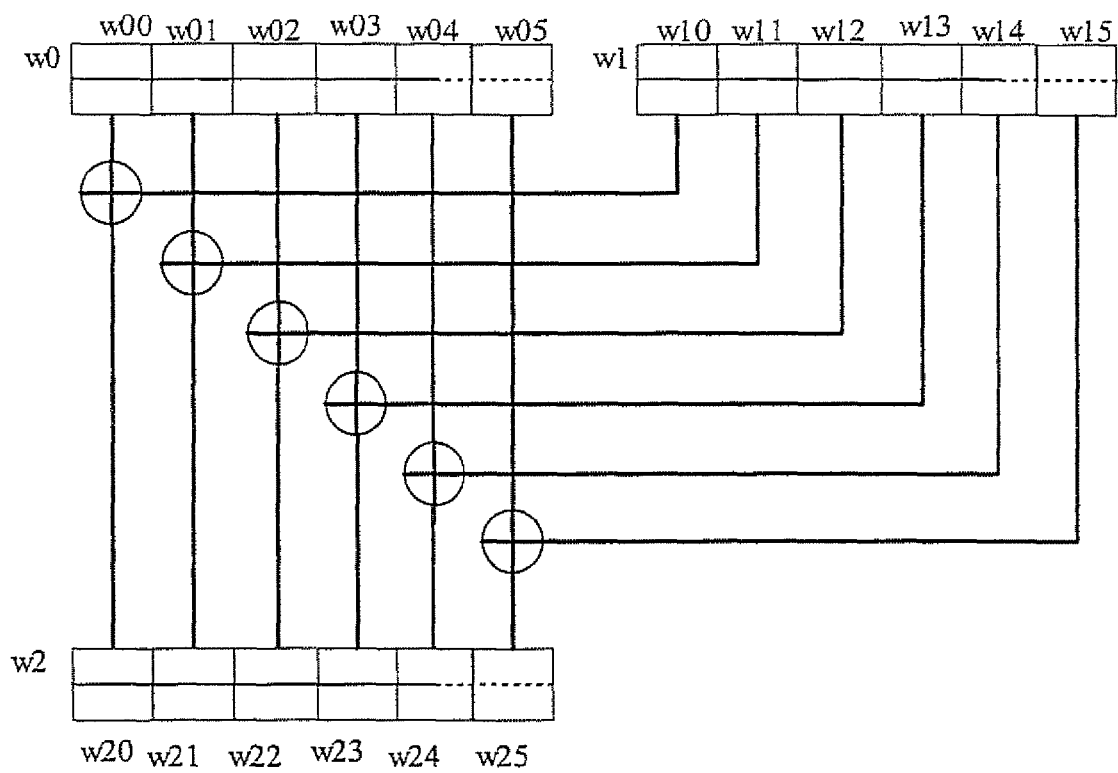
FIG. 11 is a schematic representation of a device used by the finite field engine 400 shown in FIG. 5 to add two finite field elements.

Referring to FIG. 11, a wordsized circuit 1100 implementing finite field addition 432 of two finite field elements w0 and w1 of a given word length is shown. Each element is stored comprising 6 machine words as shown in FIG. 10. The memory segment corresponding to the first element w0 is made up of the machine words w00, w01, ..., w05. Similarly, the memory segment corresponding to the second element w1 is made up of the machine words w10, w11, ..., w15. Each corresponding pair is connected to a respective XOR circuit x0, x1, ..., x5. That is, w00 and w10 connect to x0, w01 and w11 connect to x1, and so on.

Each XOR circuit is further connected to memory segment w2 comprising the 6 machine words w20, w21, ..., w25. Each XOR circuit is connected to the corresponding machine word. That is, x0 connects to w20, x1 connects to w21, and so on. To add two elements, the XOR circuits x0, x1, ..., x5 each XOR the corresponding machine words (w00, w10), ..., (w05, w15) and store the result in the corresponding output machine words w20, w21, ..., w25, so that w2=w00+w10 and so on.

The XOR circuits may be implemented by an arithmetic logic unit and a bus structure in a CPU. To add two elements w0, w1 of a finite field stored in this representation, the processor cycles through the 6 machine words w01, ..., w05 and w10, ..., w15 representing each finite field element, and applies an exclusive-or (XOR) operation denoted by $\oplus$ to the corresponding machine words. The result of this exclusive-or operation is stored in the corresponding machine word of the set of machine words w20, ..., w25 reserved for the result of the addition operation. That is:

$$w20 = w00 \oplus w10$$
$$w21 = w01 \oplus w11$$
$$\vdots$$
$$w25 = w05 \oplus w15.$$

Then, the memory segment w2 contains the sum of the two finite field elements w0 and w1, represented as the 6 machine words w20, ..., w25.

Figure 12:
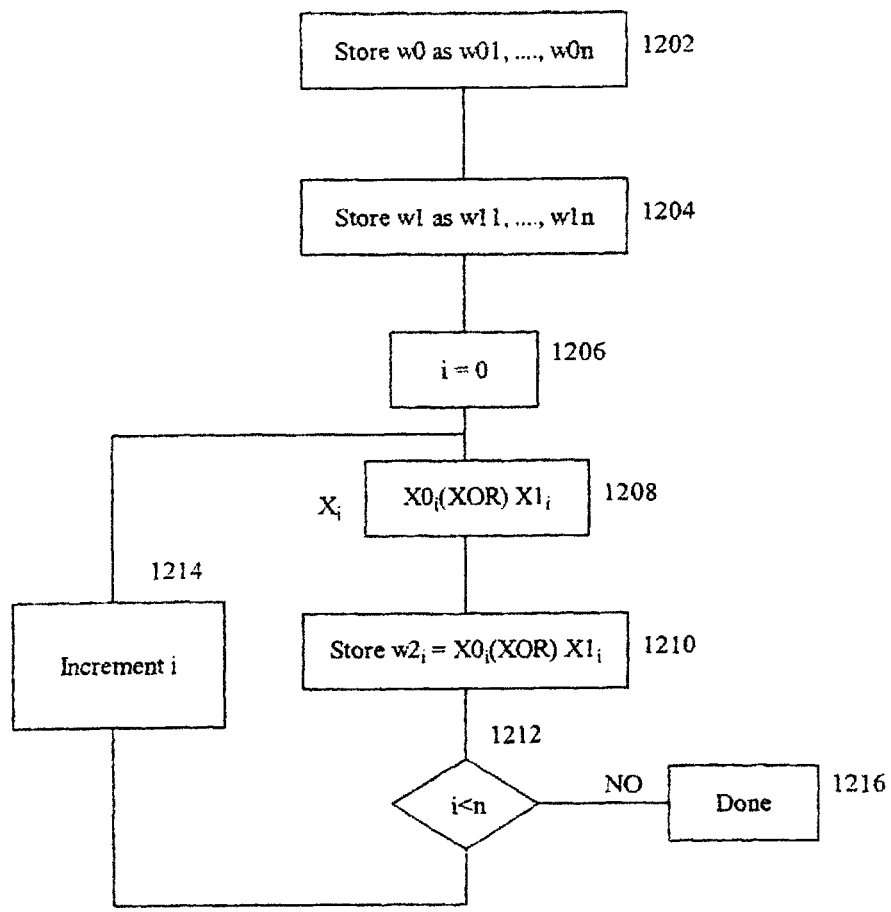
FIG. 12 is a flowchart illustrating the steps of a method using the device of FIG. 11.

Referring therefore to FIG. 12, a wordsized method for adding two elements 1200 of a given word length involves first storing the first element in a memory segment comprising a plurality of machine words 1202, and storing the second element in a memory segment comprising a plurality of machine words 1204, as in FIG. 3. Then a counter is initialized 1206 to initiate a loop through the machine words. At each iteration, an XOR of two machine words is computed 1208, and stored in the appropriate output machine word 1210. When the counter is less than the number of machine words 1212, the counter is incremented 1214, and the loop repeated. When the counter reaches the number of machine words 1212, the method terminates 1216.

The above method describes a wordsize addition for F2m, where the addition is composed of XOR's of the component words. When the finite field is Fp, the addition is composed of integer addition of the components, proceeding from the least significant to the most significant word of the representations, and also propagating the carry into the addition of the next most significant words.

Similarly, for subtraction (which is distinct from addition in Fp), word-wise subtraction is composed of word-wise subtractions, proceeding from the least significant to the most significant word of the representations. Since a negative value can be generated by this process, the reduction must handle this possibility.

Wordsized Multiplication

Figure 13:
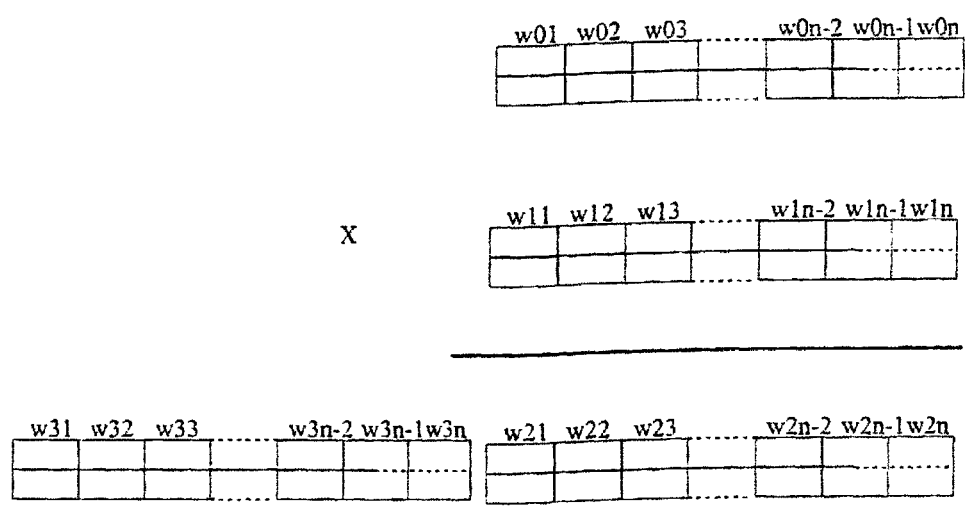
FIG. 13 is a schematic representation of a finite field multiplication operation performed by the finite field engine 400 of FIG. 5.

Referring to FIG. 13, a wordsized data storage used for multiplying two elements is shown generally by the numeral 1300. The first element w0 is stored in a register 1302 and the second element is stored in a register 1304. A pair of registers 1306 w2 and w3 are provided to store the product of w0 and w1. The use of two registers is merely to use registers of consistent size for convenience of presentation, however, the registers 1306 could be provided by one register of greater length.

Figure 14:
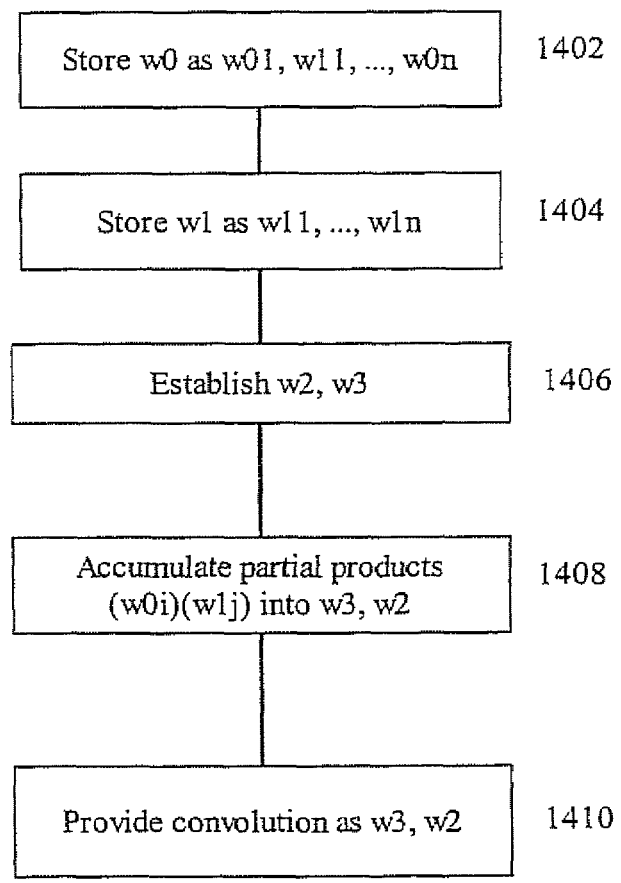
FIG. 14 is a flow chart illustrating the steps of a method according to FIG. 13.

Referring to FIG. 14, a wordsized method of multiplying the elements of FIG. 13 is shown generally by the numeral 1400. To begin, the element w0 is stored 1402 as words w01, w02, ..., w0$n$ in the register 13027 and the element w1 is stored 1404 as words w11, w12, ..., w1$n$ in the register 1304. Then the registers w27 and w3 are established 1406. The method then entails accumulating 1408 partial products formed from a word of w0 and a word of w1 into the registers w2 and w3. After all of the partial products are accumulated, it provides 1410 the convolution as the registers w3 and w2.

Figure 15:
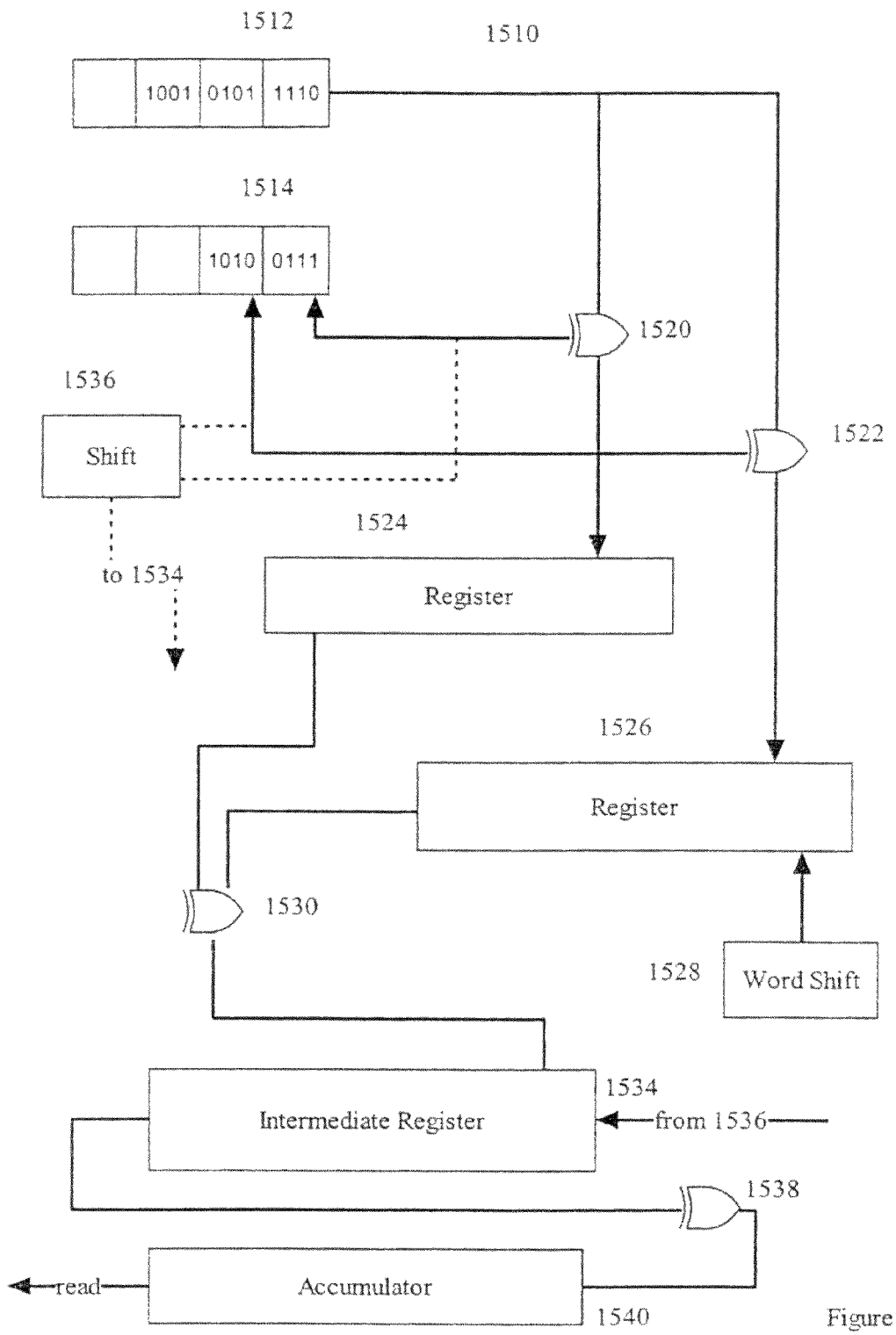
FIG. 15 is a schematic representation of a multiplication method performed by the finite field engine of FIG. 5.

Referring therefore to FIG. 15, a finite field multiplier 1510 includes a pair of registers 1512, 1514. The register 1512 contains the multiplicand, indicated by the binary string 100101011110, and the register 1514 the multiplier represented by the binary string 10100111. The register 1514 is subdivided into words, in this example each of 4 bit length and a pointer 1516, 1518 is associated with one bit of each word.

The register 1512 and the output of each pointer 1516, 1518 are connected to an XOR function 1520, 1522 respectively and the result of the XOR stored in registers 1524, 1526.

The register 1526 is associated with the pointer 1518 that reads a bit from the second word and accordingly has a word shift function 1528 associated with it to shift the contents one word to the left.

The output of the registers 1524, 1526 is connected to an XOR function 1530 whose result is stored in an intermediate register 1532. A shift signal 1534 is applied to register 1532 from a shift control 1536 that also controls the position of pointers 1516, 1518 on register 1514. The intermediate register 1532 is connected to a XOR function 1538 that also receives the output of an accumulating register 1540.

The shift control 1536 operates to consider all bit positions within 1 word in a specified order. In this example, there are 4 bit positions to consider. The following are performed for each bit position. The pointers 1516, 1518 are set to a bit position by the shift control 1536. The pointer 1516 reads the bit in the bit position in the first word. The pointer 1518 reads the bit in the bit position in the second word. For example, when the $2^{nd}$ bit position is considered, the second bit of each word is read by the respective pointer.

After the bits are retrieved, the contents of the register 1512 is read and XOR'd by the functions 1520, 1522. The results are stored in the registers 1524, 1526. For the bit of the first word, the value of register 1512 is simply stored in the register 1524 since the value of the bit is 1. The result of multiplication between the multiplicand and the bit of the second word is stored in the register 1526. Since the bit of the second word is 0, the register 1526 has a value of 0. Register 1526 is then shifted by shift function 1528 according to the bit size of the word. In the present example, since the word size is 4 bits, the intermediate value is shifted 4 places in the form of a single word shift. The word shift may be effected by offsetting the registers 1524, 1526 at the input to XOR 1530. The two intermediate values in registers 1524, 1526 are then XOR'ed by the function 1530 with the resulting value stored in the intermediate register 1532. The shift signal 1534 performs bit shifts on register 1532 in accordance with the bit position of pointers 1516, 1518. In this way, one bit shift is applied to each component 1524, 1526 of the intermediate register instead of performing separate bit shifts as in the prior art. The contents of register 1532 are XOR'd with the contents of an accumulator 1540 by the function 1538 and the result stored in the accumulator 1540. The process is repeated for each bit and at its conclusion, the accumulator holds the result of the multiplication.

Whilst, it is recognized that the bits may be considered in any order, it is generally simpler to order the bits by their significance. One option is to consider the bits from least significant to most significant. In this case, the pointer 1516 initially reads the least significant bit for the first word, i.e. 1 and the pointer 1518 reads the least significant bit for the second word, i.e. 0. The pointers move to the next more significant bit on each repetition and finish with the most significant bit.

Figure 15A:
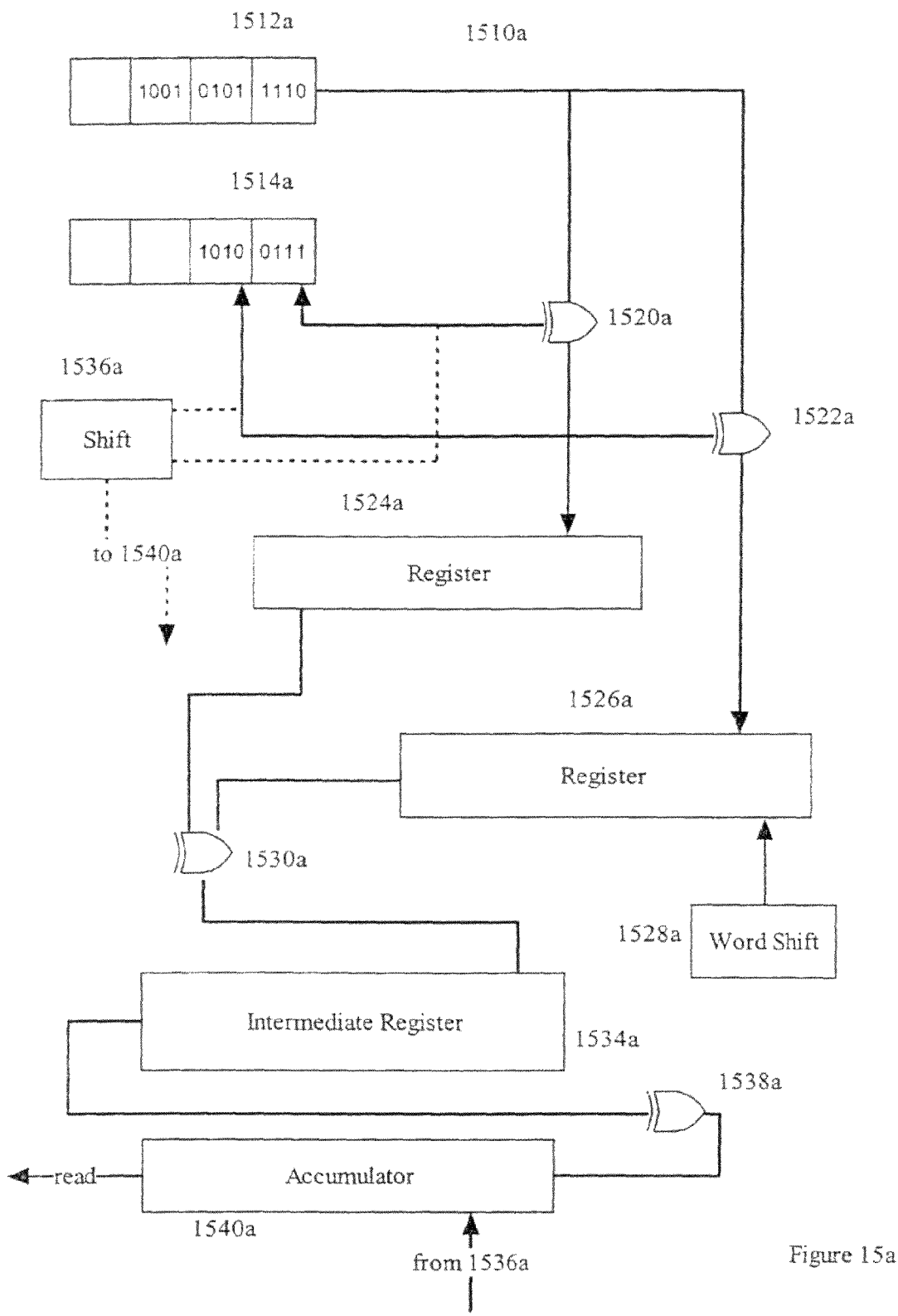

An alternative order, which provides a further reduction in the number of bit shifts required, is to consider the bits from most-significant to least significant. In this case, a circuit as shown in FIG. 15a may be used. This circuit differs from FIG. 15 in that bit shifts are performed on the accumulator. In this way, each bit shift affects previous computations, so that only 1 bit shift is required for each bit considered.

Referring therefore to FIG. 15a, a finite field multiplier is shown with like components to FIG. 15 having a suffix a for clarity. Accordingly, registers 1512a, 1514a, pointers 1516a, 1518a, XOR functions 1520a, 1522a, registers 1524a, 1526a, intermediate register 1532a, XOR function 1538a, and accumulating register 1540a are provided as in FIG. 15. However, a shift signal 1534a is applied to accumulator 1540a.

The above method describes a wordsize multiplication for $F_{2^m}$. For $F_p$, the multiplication operation is composed of wordsized multiplications. Again the finite field multiplication is composed of a wordsized non-reducing multiplication, coupled with a specific reduction engine preferably tailored to the specific finite field.

If the element A is composed of four words [A3, A2, A1, A0], and this value is to be (non-reducing) multiplied with B, also composed of four words [B3, B2, B1, B0], then the non reducing multiplication contains instructions that construct the unreduced product. Multiplying the words $A_i$ $B_j$ yields two words. Let the high word be denoted by high $(A_iB_j)$, and the low word by low $(A_i B_j)$.

The non-reducing multiplication to be used in Fp multiplication would then compose the unreduced product

[high($A_3B_3$)+C6,low($A_3B_3$)+high($A_3B_2$)+high ($A_2B_3$)+C5, low($A_3B_2$)+low($A_2B_3$)+high($A_3B_1$)+high($A_2B_2$)+high ($A_1B_3$)+C4, low($A_3B_1$)+low($A_2B_2$)+low($A_1B_3$)+high($A_3B_0$)+high ($A_2B_1$)+high($A_1B_2$)+high($A_0B_3$)+C3, low($A_3B_0$)+low($A_2B_1$)+low($A_1B_2$)+low($A_0B_3$)+high ($A_2B_0$)+high($A_1B_1$)+high($A_0B_2$)+C2, low($A_2B_0$)+low($A_1B_1$)+low($A_0B_2$)+high($A_1B_0$)+high ($A_0B_1$)+C1 low($A_1B_0$)+low($A_0B_1$)+high($A_0B_0$)+C0, low($A_0B_0$)]=[$P_7,P_6,P_5,P_4,P_3,P_2,P_1,P_0$] the unreduced Product.

Here $C_i$ is the carry out of word i of the Product (not necessarily 0 or 1, but in general possibly larger).

Similarly, specific wordsize squaring for $F_p$ is constructed similarly to multiplication. Since for squaring, Ai=Bi, slightly more than half the products need to be computed.

Wordsized Inversion

Figure 16:
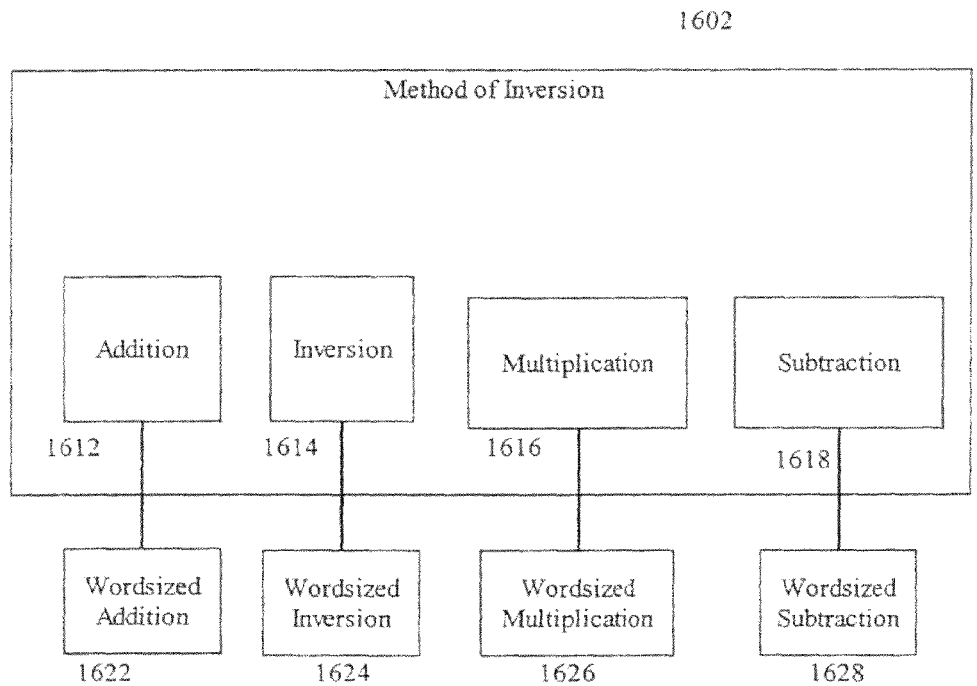
FIG. 16 is a schematic representation of a finite field inversion method performed by the finite field engine 400 of FIG. 5.

Referring to FIG. 16, a wordsized method of inverting an element is shown Generally by the numeral 1600. Finite field inversion is performed using the Extended Euclidean Algorithm, which is based on computing the following remainders:

$$r_0 = q_1 r_1 + r_2$$

$$r_1 = q_2 r_2 + r_3$$

$$\ldots$$

$$r_{m-2} = q_{m-1} r_{m-1} + r_m$$

$$r_{m-1} = q_m r_m$$

Each remainder requires the computation of a quotient $q_i$, and then determining the remainder by multiplication and subtraction. Intermediate values are stored, one of which is equal to the inverse at the end of the algorithm. There are many variants of the extended Euclidean Algorithm, known as the binary inverse, almost inverse etc. Each of these methods uses certain fundamental operations of addition, division, multiplication, subtraction, etc.

Figure 6:
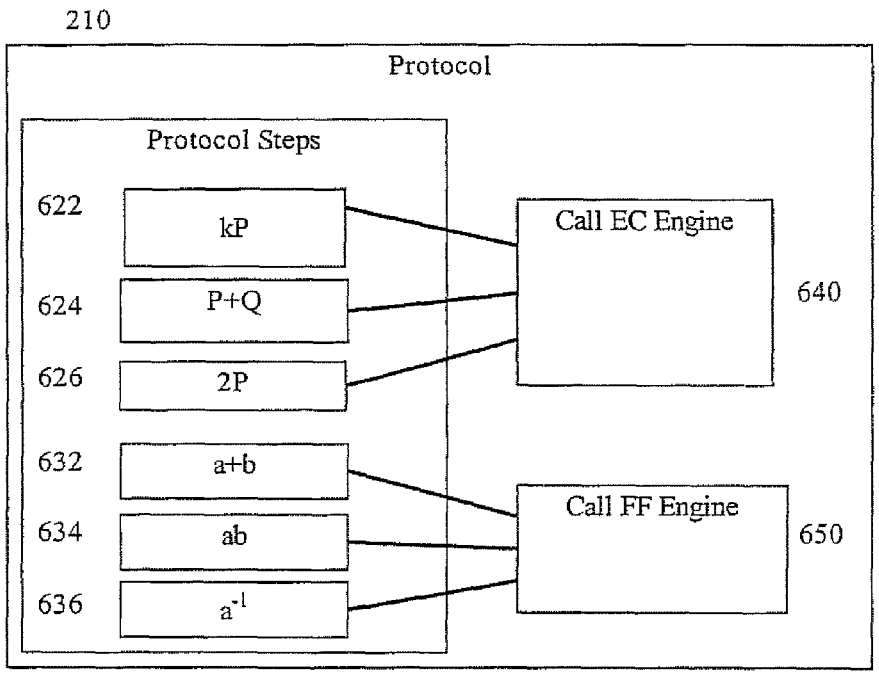
FIG. 6 is a schematic representation of a protocol performed by the cryptographic engine 200 in FIG. 3.

When the elements are stored as shown in FIG. 6, the inversion is implemented by following the same steps, but using generic methods for the addition, division, multiplication, and subtraction. Accordingly, a finite field inversion method 1602 calls addition 1612, division 1614, multiplication 1616, and subtraction 1618. These basic operations are implemented by using generic methods for addition 1622, division 1624, multiplication 1626, and subtraction 1628. In fact, inversion will after re-implement these operations as function calls.

In a preferred method of inversion it is recognized that whilst two values ("b" and "ax+bp") must be stored for each iteration, the number of words required to store each changes. There is a leveling process such that the "ax+bp" quantity is always getting smaller and the "a" quantity tends to get bigger.

Figure 17:
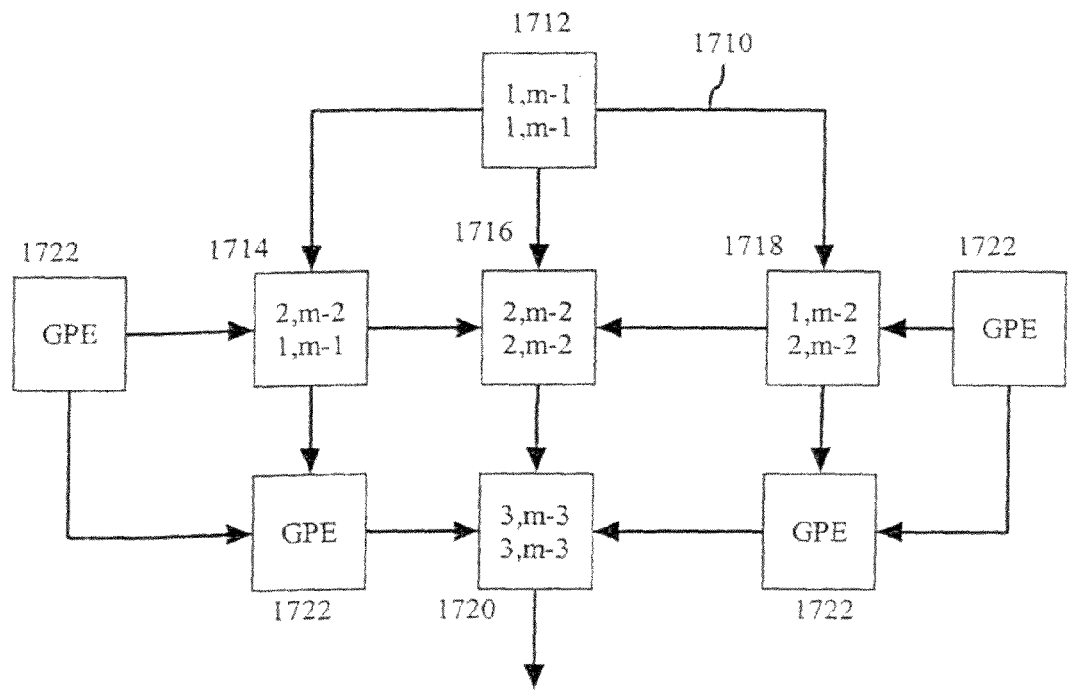
FIG. 17-19 is a schematic representation of an inversion method performed by the finite field engine 400 of FIG. 5.

Referring to FIG. 17, a schematic drawing of sample calculations paths is shown. A plurality of dedicated computation engines 1712, 1716, 1718, and 1720 are provided along with general purpose computational engines 1722. The calculation paths used by the engines are shown generally as numeral 1710. The dedicated engines 1712, 1716, and 1720 are specially optimized to process a pair of parameters with equal word lengths. It is expected these engines would be used the most and accordingly they are the most optimized. The dedicated engines 1714, 1718, are arranged to process a pair of parameters in which the word lengths differ by one word. These engines are not optimized as highly as the equal word length engines, since they are expected to be used a bit less. Accordingly, the fastest calculation path is to involve only the dedicated engines 1712, 1716, and 1720. Occasionally, the word length of the parameters will vary further, and the dedicated engines 1714, 1718 may need to be used. In this case however, the leveling process of the Euclidean Algorithm will tend to yield the result which lies on the most efficient calculation path. In some situations, the parameters will require the use of a general-purpose engine 1722. These engines need not optimized and their use usually imposes a performance penalty when compared with the fastest calculation path. However, the output of the general-purpose engine is likely to be closer to the optimal calculation path.

Engine 1724 show this tendency of the general purpose entrance to direct calculations to the optimal path.

The number of dedicated computational engines which are constructed and used as a matter of trade off between cost and speed benefit. Each dedicated computational engine requires more resources then a general-purpose computational engine, however dedicated computational engines allow for faster execution. While using only dedicated computational engines would be quite fast, there would be a prohibitive resource requirement.

Figure 18:
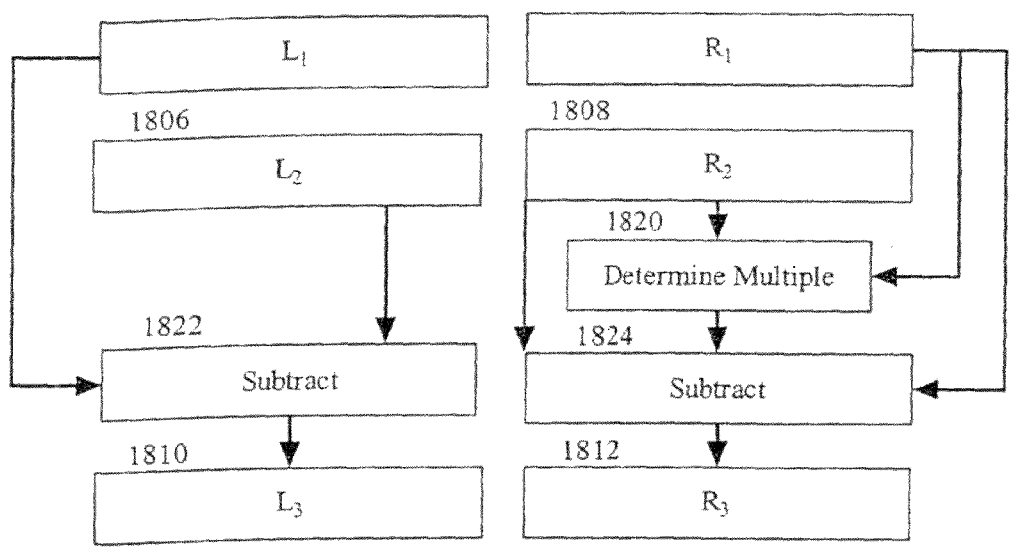

An exemplary circuit used in the method of inversion is shown generally in FIG. 18. The method of inversion operates on two equations, having parameters referred to as L1 (1802) R1 (1804), L2 (1806) and E2 (1808). The parameters L1 and L2 correspond to the parameter "a" and description of the extended Euclidean Algorithm and the parameters R1 and R2 correspond the parameters "ax+bp" in description of the extended Euclidean Algorithm. A pair of results are stored in 1810 and 1812, referred to as L3 and R3. There is a method of determining a multiple (1820), and subtractors 1822, 1824. In use, component 1820 determines a multiple of R2 to be subtracted from R1. Then the subtractors 1822, 1824 subtract the multiple of L2 and R2 from L1 and R1 respectively. The results are stored in L3 (1810), and R3 (1812). The values in L2 and R2 are then placed in L1 and R1 and the results from L3 and R3 are placed in L2 and R2, for the next iteration.

Figure 19:
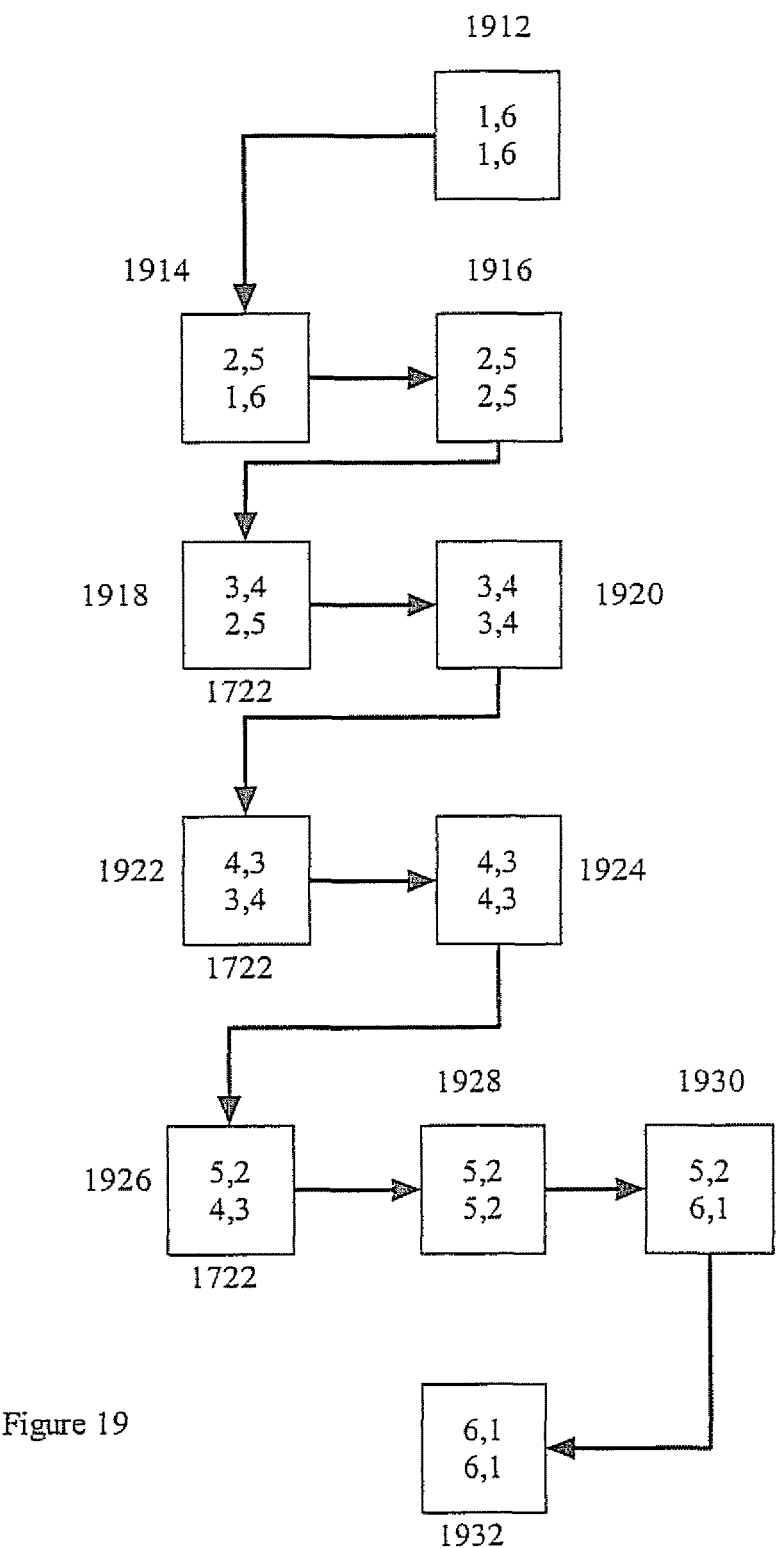

The following example illustrates a particular sequence of computations. The calculation path used is shown in FIG. 19. In this example, it is desired to compute the inverse of a value in the finite field $F_2^{163}$. The irreducible is $x^{163}+x^7+x^6+x^3+1$.

The first parameters operated on are as follows. Their word sizes are 1, 6 and 1, 6 so engine 1912 is used.
80000000, 00000008 00000000 00000000 00000000 00000000 000000C9 00000000, 00000007 C0AD7A37 E056529D 011E70FA 8D9A9887 58894F25

While decreasing the RHS, 7 steps are performed in the processor 1912 with the RHS of equal word length to arrive at:
28000000 00000000, 7A1A1334 3D0D08EE 983ADA97 2D062E5C A45DF765 E0000000, 00000002 1843125D 0C218F1D 20ACF662 177E1F53 47558E6F At this stage, the RHS differ by 1 since the word sizes are 2, 5 and 1, 6 and therefore processor 1914 is used for a further 4 steps. The alignment then has equal word lengths of five words on the RHS as indicated below so the dedicated processor 1916 can be used on the representation:
B8000000 00000000, 7A1A1334 3D0D08EE 983ADA97 2D062E5C A45DF765 03800000 00000000, 0A59B49C 052CDA58 BA238E67 6D81D1B6 DAAECE5F 54 steps follow at this alignment until the following is obtained
114BC508 60000000 00000000, 50628345 A834DC60 CA40E435 809ECB43 EAE015AD C0000000, 00000006 3F872A57 1FCBF672 6C3E79F3 6633CEBB At this stage the RHS differs by 1 since the word sizes are 3, 4 and 2, 5 and so the dedicated processor indicated at 1918 is used.

2 steps follow at this alignment until equal word lengths are obtained.
FBABD5F5 A0000000 00000000, 50628345 A834DC60 CA40E435 809ECB43 1D5C02B5 B8000000 00000000, CDFCB522 56FFE542 54CFD3B8 DCD5A0BF 54 steps follow at this alignment using engine 1920
1D3C34DB F2D87350 20000000 00000000, BBF6F1DF CE734830 490EA789 A5080FC5 0AEB0D71 20000000, 00000002 E0C945FB 2C4C9330 EF04A985

2 steps follow at this alignment using engine 1922

B83431B1E F8337E21 00000000 00000000, BBF6F1DF CE734830 490EA789 294203F1 42BAC35C 48000000 00000000, 96CFED09 388FF6C0 29828383

58 steps follow at this alignment using engine 1924
000623FE 2C204627 76BEF5F7 3A000000 00000000, 2BB55F13 B2A7554D 958F4B55 CF461188 8998F8A2 00000000, 00000006 8909F4B1346B7361

4 steps follow at this alignment using engine 1926
B0EABA7E 90B7D3CD DD40337D BA000000 00000000, 2BB55F13 B2A7554D 12B1E96A B9E8C231 11331F14 40000000 00000000, C19D3AFD 898A2FC3

52 steps follow at this alignment using engine 1928
884353A4 5D8C8177 E383C0C5 A845C9D7 70000000, 00000001 B63B14D1 17295514 353C12F7 8E69441A A8477158 D8000000 00000000, 0EE15DED 2 steps follow at this alignment using engine 1930
2210D4E9 1763205D F8E0F031 6A117275 DC000000 00000000, 6E36924F 9F6A06B0 68B09380 6DEA84DF 0002B88F A8000000 00000000, 0EE15DED and finally, 38 steps follow at this alignment using engine 1932
03A2221E F276742E A140A272 B799BAA1 58A492F7 70000000, 00000001 EBE8CB36 E8A8AB15 588F9267 7FBC5558 9E7D8C26 00000000, 00000013

At each alignment the appropriate dedicated processor is selected and used until the alignment conditions are no longer met. If during the reduction a condition is obtained that in not met by a dedicated processor than the general purpose engines are used until an alignment is again obtained that meets one of the dedicated processors conditions. At the final step, the RHS corresponds to a value of a 1 and therefore the inverse for 00000007 C0AD7A37 E0546B29D 011E70FA 8D9A9887 58894F25 using $x^{163}+x^7+x^6+x^3+1$ as the modulus is:
03A2221E F276742E A140A272 B799BAA1 58A492F7 70000000.

It will be recognized that the equal word length processor is used the most, and the engines located further from the optimal path of equal word length engines are used less often. This embodiment of inversion has been shown with special purpose engines to handle the case when the right hand sides have equal word length and when the word lengths of the right hand sides differ by one.

In another embodiment of inversion, the only special-purpose engines deployed are those for right hand sides with equal word length. This embodiment results in smaller code, and the equal word length engine is expected to be used the most, as exemplified above. With this embodiment, the engines 1912, 1916, 1920, 1924, 1928, and 1932 are special-purpose engines, while a general-purpose engine performs the functions of engines 1914, 1918, 1922, 1926, and 1930.

It will be recognized that the provision of general-purpose engines and special-purpose engines may be applied to other methods with a similar leveling process, such as almost-inverses and other variants of the Extended Euclidean Algorithm.

Modular Reduction

Modular reduction is preferably provided for each finite field that is needed. The modular reduction routine is provided with instructions specific to the modulus used. Specialized routines such as those in the IEEE P1363 standard may be used to perform the modular reduction 450 of the FF engine 400. It will be appreciated that by providing particular modular reduction for each finite field, the speed of the method may be optimized.

Figure 20:
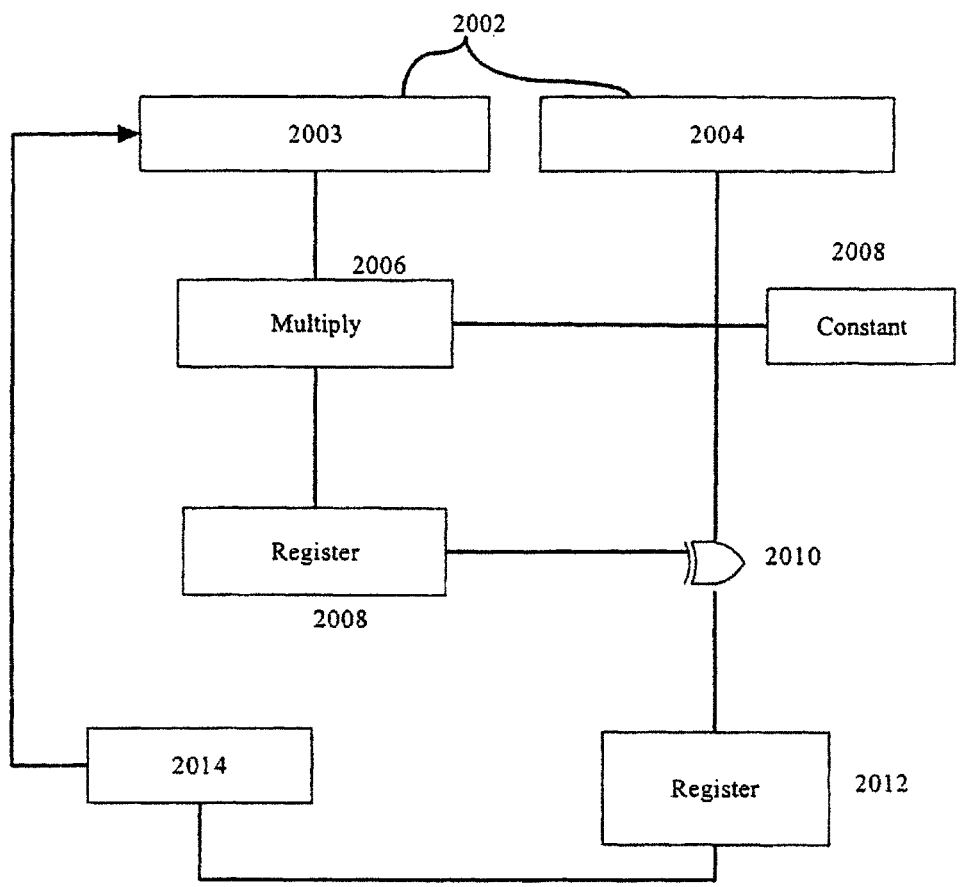
FIG. 20 us a schematic representation of a modular reduction method performed by the finite field engine 400 of FIG. 5.

In a further embodiment, a method of modular reduction using precomputation is provided that may be useful for certain reductions. Referring to FIG. 20, a method of performing the modular reduction 450 of the FF engine 400 is shown generally by the numeral 2000.

Each finite field will have a constant value associated with it. This value z is equal to $2^{(k+1)}$ mod n. The value z allows the portion of e above the (k+1) to be reduced.

In operation, the register 2002 is loaded with the value e and is split into an upper portion 2003 and a lower portion 2004.

The upper portion 2003 holds all words past the $(k+1)^{st}$ word of e.

The upper portion 2003 and the constant z 2008 are provided to the multiplier 2006. The result of the multiplication is stored in register 2008. The registers 2008 and 2004 are operated on by XOR 2010 to provide a result in register 2012. The result in register 2012 will typically be fewer words in length than the value e, since the constant z 2008 is smaller than n.

Further repetitions 2014 may be necessary to her reduce the value 2012.

After a suitable number of repetitions, the register 2012 will contain a value v, which is 1 word longer than n. The extra word is reduced by computing a value $$r = \left\lfloor \frac{2^{kw}}{n} \right\rfloor.$$

Then a quotient $$q = \left\lfloor \frac{v \cdot r}{2^{kw}} \right\rfloor$$

is computed. The value v is then equivalent to v-qn mod n, but v-qn is relatively easy to compute and has a relatively small value. Its value may not be less than n, but it will be equivalent to v modulo n and the number of words it occupies will be no more than the number of words in n.

In the preferred embodiment, finite field elements are thus stored in memory segments larger than the minimum bit size required, with the ends of the memory segments falling on a machine 32-bit word boundary. Operations can be performed on these elements by acting on the memory segment as a whole, while ignoring the extra bits. These 192-bit segments are suitable for representing elements of fields $F_{2^m}$ with $161 \leq m \leq 192$. Each finite field element is represented as 6 machine words, regardless of the size of the finite field.

When implementing an elliptic curve cryptosystem, it will be known that certain size finite fields will need to be used. These will usually lie in a particular range, and there will be some limit to the maximum size of field needed. With current standards, such a range might be 155 to 2-39 bits. Alternatively, in a higher security application, 256 to 512 bits might be the known range.

In order to deal with several sizes of finite fields, the size of the largest finite field needed is first computed. From this size, a value may be computed indicating how many machine words are needed to store finite field elements. This value may be precomputed and used during the implementation of software. With the upper limit of 239 bits shown above and a 16-bit word size, 15 machine words would be necessary.

| Maximum Field Size | Machine Word Size | Number of Machine Words Needed |
|---|---|---|
| 163 bit | 8 bit | 21 |
| 163 bit | 16 bit | 11 |
| 163 bit | 32 bit | 6 |
| 163 bit | 64 bit | 2 |

Computing the necessary number of machine words requires a simple calculation of the maximum field size needed divided by the machine word size, rounded up to an integer.

Once this number is found, a multiplier may be implemented that is able to use any finite field with m less than the predetermined number. Elements may be stored in registers as in the preferred embodiment, with unused bits. These elements may be added by using an adder as in FIG. 3 with more machine words in each register and more XOR gates.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method of performing a finite field operation on elements of a finite field, the method comprising a processor:
    obtaining a first set of instructions for performing the finite field operation on values representing the elements of the finite field;
    executing the first set of instructions to generate an unreduced result completing the finite field operation;
    obtaining a second set of instructions for performing a modular reduction for a specific finite field;
    executing the second set of instructions on the unreduced result to generate a reduced result; and
    providing the reduced result as an output for use in a cryptographic operation.

2. The method of claim 1, further comprising receiving a first input indicative of the finite field operation, wherein obtaining the first set of instructions comprises selecting the first set of instructions from a plurality of sets of instructions each corresponding to a respective type of finite field operation.

3. The method of claim 1, further comprising receiving a second input indicative of the specific finite field.

4. The method of claim 1, wherein the values representing the elements of the finite field are a predetermined number of words, and the first set of instructions is executed using a memory segment large enough to hold the values.

5. The method of claim 1, wherein the finite field operation comprises any one of addition, subtraction, multiplication, squaring, and inverting.

6. The method of claim 1, further comprising determining one of a plurality of cryptographic protocols, and initiating the one of the plurality of cryptographic protocols, wherein the one of the cryptographic protocols comprises the cryptographic operation.

7. The method of claim 6, wherein the determining the one of the plurality of cryptographic protocols comprises receiving a third input indicative of the one of the plurality of cryptographic protocols.

8. A non-transitory computer readable medium comprising computer executable instructions for performing a finite field operation on elements of a finite field, the computer readable medium comprising instructions for:

obtaining a first set of instructions for performing the finite field operation on values representing the elements of the finite field;

executing the first set of instructions to generate an unreduced result completing the finite field operation;

obtaining a second set of instructions for performing a modular reduction for a specific finite field;

executing the second set of instructions on the unreduced result to generate a reduced result; and providing the reduced result as an output for use in a cryptographic operation.

9. The non-transitory computer readable medium of claim 8, further comprising instructions for receiving a first input indicative of the finite field operation, wherein obtaining the first set of instructions comprises selecting the first set of instructions from a plurality of sets of instructions each corresponding to a respective type of finite field operation.

10. The non-transitory computer readable medium of claim 8, further comprising instructions for receiving a second input indicative of the specific finite field.

11. The non-transitory computer readable medium of claim 8, wherein the values representing the elements of the finite field are a predetermined number of words, and the first set of instructions is executed using a memory segment large enough to hold the values.

12. The non-transitory computer readable medium of claim 8, wherein the finite field operation comprises any one of addition, subtraction, multiplication, squaring, and inverting.

13. The non-transitory computer readable medium of claim 8, further comprising instructions for determining one of a plurality of cryptographic protocols, and initiating the one of the plurality of cryptographic protocols, wherein the one of the cryptographic protocols comprises the cryptographic operation.

14. The non-transitory computer readable medium of claim 13, wherein the determining the one of the plurality of cryptographic protocols comprises receiving a third input indicative of the one of the plurality of cryptographic protocols.

15. A cryptographic engine comprising a processor and memory, the memory storing computer executable instructions for performing a finite field operation on elements of a finite field, the computer readable medium comprising instructions for:

obtaining a first set of instructions for performing the finite field operation on values representing the elements of the finite field;

executing the first set of instructions to generate an unreduced result completing the finite field operation;

obtaining a second set of instructions for performing a modular reduction for a specific finite field;

executing the second set of instructions on the unreduced result to generate a reduced result; and providing the reduced result as an output for use in a cryptographic operation.

16. The cryptographic engine of claim 15, further comprising instructions for receiving a first input indicative of the finite field operation, wherein obtaining the first set of instructions comprises selecting the first set of instructions from a plurality of sets of instructions each corresponding to a respective type of finite field operation.

17. The cryptographic engine of claim 15, further comprising instructions for receiving a second input indicative of the specific finite field.

18. The cryptographic engine of claim 15, wherein the values representing the elements of the finite field are a predetermined number of words, and the first set of instructions is executed using a memory segment accessible to the processor which is large enough to hold the values.

19. The cryptographic engine of claim 15, wherein the finite field operation comprises any one of addition, subtraction, multiplication, squaring, and inverting.

20. The cryptographic engine of claim 15, further comprising instructions for determining one of a plurality of cryptographic protocols, and initiating the one of the plurality of cryptographic protocols, wherein the one of the cryptographic protocols comprises the cryptographic operation.

21. The cryptographic engine of claim 20, wherein the determining the one of the cryptographic protocols comprises receiving a third input indicative of the one of the plurality of cryptographic protocols.

\* \* \* \* \*